(12) United States Patent
Ueta et al.

(10) Patent No.: US 11,446,738 B2
(45) Date of Patent: *Sep. 20, 2022

(54) METHOD FOR MANUFACTURING SILVER NANOWIRE

(71) Applicant: SEIKO PMC CORPORATION, Tokyo (JP)

(72) Inventors: Yasuhiro Ueta, Chiba (JP); Munetoshi Kurimura, Chiba (JP)

(73) Assignee: SEIKO PMC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/053,267

(22) PCT Filed: May 16, 2019

(86) PCT No.: PCT/JP2019/019484
§ 371 (c)(1),
(2) Date: Nov. 5, 2020

(87) PCT Pub. No.: WO2019/225469
PCT Pub. Date: Nov. 28, 2019

(65) Prior Publication Data
US 2021/0129225 A1     May 6, 2021

(30) Foreign Application Priority Data

May 25, 2018   (JP) .............. JP2018-100568

(51) Int. Cl.
*B22F 9/24* (2006.01)

(52) U.S. Cl.
CPC .......... *B22F 9/24* (2013.01); *B22F 2301/255* (2013.01); *B22F 2304/054* (2013.01)

(58) Field of Classification Search
None
See application file for complete search history.

(56) References Cited

U.S. PATENT DOCUMENTS

| 2008/0210052 A1 | 9/2008 | Allemand | |
| 2009/0311530 A1* | 12/2009 | Hirai | C22C 5/06 428/401 |
| 2011/0048170 A1 | 3/2011 | Bhatia et al. | |
| 2012/0301348 A1* | 11/2012 | Whitcomb | B82Y 30/00 420/469 |
| 2014/0238833 A1 | 8/2014 | Virkar et al. | |
| 2015/0290715 A1 | 10/2015 | Moody et al. | |
| 2016/0121403 A1* | 5/2016 | Suganuma | B22F 1/004 75/370 |
| 2016/0368049 A1 | 12/2016 | Saito et al. | |
| 2018/0281073 A1* | 10/2018 | Hara | H01B 1/02 |

FOREIGN PATENT DOCUMENTS

| JP | 2009-222792 A | 10/2009 |
| JP | 2013-503260 A | 1/2013 |
| JP | 2013-144822 A | 7/2013 |
| JP | 2013-194290 A | 9/2013 |
| JP | 2015-180772 A | 10/2015 |
| JP | 2016-519206 A | 6/2016 |
| JP | 2017-515983 A | 6/2017 |

OTHER PUBLICATIONS

International Search Report (ISR) dated Jul. 2, 2019 filed in PCT/JP2019/019484.

* cited by examiner

*Primary Examiner* — George Wyszomierski
(74) *Attorney, Agent, or Firm* — Rankin, Hill & Clark LLP

(57) ABSTRACT

The present invention is a method for manufacturing silver nanowires, including using a growth control agent and a halide salt in a polyol to obtain silver nanowires from a silver salt, and further using an α-hydroxycarbonyl compound (a) represented by formula (1) below: (in general formula (1), R indicates any of a hydrogen atom and a hydrocarbon group having 1 to 6 carbon atoms).

[(1)]

(a)

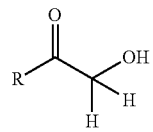

17 Claims, No Drawings

METHOD FOR MANUFACTURING SILVER NANOWIRE

TECHNICAL FIELD

The present invention relates to a method for manufacturing silver nanowires which includes causing a silver salt to react in a polyol in the presence of a growth control agent, a halide salt, and an α-hydroxycarbonyl compound having a specific moiety structure.

BACKGROUND ART

In recent years, there has been an increasing use of display devices such as a liquid crystal display, a plasma display, an organic electroluminescence display, and an electronic paper, input sensors such as a touch panel, and solar cells, which takes advantage of sunlight, such as a thin film-type amorphous Si solar cell and a dye-sensitized solar cell. Accordingly, there is an increasing demand for a transparent conductive film which is a member essential to these devices.

As this transparent conductive film, a thin film containing as a main component an ITO (an oxide of In and Sn), which is a transparent oxide, is mainly used. The thin film containing an ITO is generally prepared by a vapor phase method using a sputter apparatus or a vapor deposition apparatus in order to obtain high transparency and high conductivity. However, this preparation method requires a large-scale and complicated apparatus and consumes a large amount of energy. Therefore, there is a need for the development of a technology which can reduce a manufacturing cost and an environmental load. Also, since there is a trend toward increasing the area of a transparent conductive material, the transparent conductive material is increasingly required to be light, flexible, and low in resistance.

Meanwhile, there is research on a transparent conductive film containing nanowires of a metal element, which can be manufactured by a wet method and is high in lightweight properties and flexibility. The nanowires of a metal element, which have a diameter as small as 250 nm or less, have high light transmittance in the visible light region and are expected to be applied as a transparent conductive film to replace an ITO. Especially, a transparent conductive film including silver nanowires has high conductivity and stability and therefore attracts attention.

As a method for manufacturing such silver nanowires, a method of causing a silver compound, which serves as a source of silver nanowires, to react together with a halide ion and a growth control agent with, as a solvent, a polyol such as ethylene glycol to act as a reducing agent is proposed (for example, see Patent Literature 1).

However, the method for manufacturing silver nanowires with a polyol had a problem of reproducibility. That is, since the manufacturing lot of a polyol varies, nanowires having a certain shape (major axis length and diameter) cannot be stably manufactured even when the manufacture is attempted under identical reaction conditions. Therefore, an improvement such as performing a nitrogen purge is made in Patent Literature 2.

Also, the transparent conductive film containing silver nanowires has higher transparency as the diameter of the silver nanowires is smaller. Therefore, finer silver nanowires are preferable for the manufacture of the transparent conductive film. However, silver nanowires having an average diameter of around 75 nm can only be obtained by the method of Patent Literature 2. Accordingly, a method for manufacturing silver nanowires having a small wire diameter is currently under intensive research.

For example, Patent Literature 3 discloses a technology for stably manufacturing thin (average diameter 50 nm or less) and long (average length 10 μm or more) silver nanowires by further using an alkali metal hydroxide and an aluminum salt at a specific ratio in Patent Literature 1. In this method, silver nanowires having a certain shape can be manufactured, but a problem is that time is taken for the manufacture.

Also, Patent Literature 4 presents steps of synthesis and purification for manufacturing silver nanowires having a clearly defined size distribution and discloses that in a coating liquid containing silver nanowires obtained by a specific manufacturing method, more than 80% of silver nanostructures having an aspect ratio of at least 3 has a diameter of less than 25 nm. According to this method, silver nanowires having a certain shape and quality can be manufactured at a high yield, but a problem was that a silver salt is added twice resulting in a complicated synthesis procedure, and time is taken for the manufacture resulting in reduced productivity.

CITATION LIST

Patent Literatures

Patent Literature 1: U.S. Published Patent Application No. 2008/0210052
Patent Literature 2: JP-T-2013-503260
Patent Literature 3: JP-A-2015-180772
Patent Literature 4: JP-T-2017-515983

SUMMARY OF THE INVENTION

Problems to be Solved by the Invention

In view of the above-described problems in the known technologies in the art, an objective of the present invention is to provide a method for efficiently and stably manufacturing silver nanowires having a certain shape (major axis length and diameter) by a simple method.

Solutions to the Problems

The present inventor intensively conducted research for solving the above-described problems. As a result, it was found that the above-described problems can be solved by a method for manufacturing silver nanowires which includes causing a growth control agent, a halide salt, and a silver salt to react in a polyol in the presence of an α-hydroxycarbonyl compound having a specific moiety structure. Thus, the present invention has been accomplished.

That is, the present invention is as follows.

(1) A method for manufacturing silver nanowires including using a growth control agent and a halide salt in a polyol to obtain silver nanowires from a silver salt, and further using an α-hydroxycarbonyl compound (a) represented by formula (1) below.

(a) <general formula (1)>

[Chemical Formula 1]

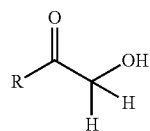

(in general formula (1), R indicates any of a hydrogen atom and a hydrocarbon group having 1 to 6 carbon atoms).

(2) The method for manufacturing silver nanowires according to the above-described (1), in which the α-hydroxycarbonyl compound (a) is hydroxyacetone or α-hydroxyacetophenone.

(3) The method for manufacturing silver nanowires according to the above-described (1) or (2), in which the silver salt is silver nitrate.

(4) The method for manufacturing silver nanowires according to any one of the above-described (1) to (3), in which a molar ratio of the α-hydroxycarbonyl compound (a) to silver atoms in the silver salt is 0.20 to 3.0.

(5) The method for manufacturing silver nanowires according to any one of the above-described (1) to (4), including a step of mixing a first solution containing the α-hydroxycarbonyl compound (a) and a second solution containing the silver salt at a reaction temperature over 10 minutes or more.

(6) The method for manufacturing silver nanowires according to any one of the above-described (1) to (5), in which a concentration of the growth control agent to a reaction liquid is 0.40% by mass or more.

(7) The method for manufacturing silver nanowires according to any one of the above-described (1) to (6), in which a molar ratio of halogen atoms in the halide salt to silver atoms in the silver salt is 0.010 to 0.30.

Effects of the Invention

According to the method for manufacturing silver nanowires of the present invention, silver nanowires having a certain shape can be efficiency obtained for a shorter time than the known technologies, even when the manufacturing lot of a polyol varies. Furthermore, the reaction can be performed with higher energy efficiency at a lower temperature than when the α-hydroxycarbonyl compound defined by the present invention is not used.

DESCRIPTION OF THE EMBODIMENTS

Hereinafter, the present invention will be described in detail.

[Polyol]

The polyol used in the present invention is not particularly limited, as long as it is a compound capable of reducing a silver ion. At least one polyol can be appropriately selected from compounds having two or more hydroxyl groups depending on its intended use. Examples of the polyol preferably used in the present invention include: diols such as ethylene glycol, propane diol, butane diol, pentane diol, hexane diol, diethylene glycol, dipropylene glycol, triethylene glycol, and tripropylene glycol, and isomers thereof; triols such as glycerin, butane triol, pentane triol, and hexane triol, and isomers thereof; tetraols such as butane tetraol, pentane tetraol, and hexane tetraol, and isomers thereof; pentaols such as pentane pentaol and hexane pentaol, and isomers thereof; and hexols such as hexane hexol and isomers thereof. Among these, a diol of a saturated hydrocarbon having 1 to 5 carbon atoms and a triol of a saturated hydrocarbon having 1 to 5 carbon atoms are preferable, because they are liquid at normal temperature, and a growth control agent is easily dissolved. Especially, ethylene glycol, 1,2-propanediol (propylene glycol), 1,3-propanediol, and glycerin are more preferably used, and propylene glycol is further preferably used.

[Growth Control Agent]

The growth control agent used in the present invention is not particularly limited, and at least one polymer can be appropriately selected depending on its intended use. Specific examples thereof include polyvinyl pyrrolidone (PVP), poly(meth)acrylamide, poly-N-substituted (meth)acrylamide, poly(meth)acrylic acid and a derivative thereof, polyvinyl alcohol, and a copolymer containing these as a main component. Among these, a polymer having an amido group is preferable, polyvinyl pyrrolidone and poly-N-substituted (meth)acrylamide are more preferable, and polyvinyl pyrrolidone is further preferable. The N-substituted (meth) acrylamide used herein is not particularly limited, as long as one or more hydrogen atoms at the N-position of (meth) acrylamide are substituted with a functional group such as an alkyl group, a hydroxyalkyl group, an aryl group, and an alkoxyalkyl group. The molecular structure of the above-described polymer may be linear or may be crosslinked to such a degree that the solubility to the dispersion solvent is not inhibited. Also, another monomer, as a polymerization ingredient of the above-described polymer, can be introduced through copolymerization to such a degree that the solubility into a polyol and the formation of silver nanowires are not inhibited.

Specific examples of another copolymerizable monomer include (meth)acrylic acid esters such as ethyl (meth)acrylate, butyl (meth)acrylate, 2-ethylhexyl (meth)acrylate, cyclohexyl (meth)acrylate, phenyl (meth)acrylate, benzyl (meth)acrylate, isobornyl (meth)acrylate, and dimethylaminoethyl (meth)acrylate aromatic vinyls such as styrene, α-methylstyrene, and vinyl naphthalene; N-unsubstituted (meth)acrylamides such as (meth)acrylamide; carboxylic acid vinyl esters such as vinyl acetate, vinyl propionate, vinyl butyrate, vinyl cyclohexanecarboxylate, vinyl benzoate, vinyl cinnamate, and vinyl sorbate; unsaturated carboxylic acids such as (meth)acrylic acid, crotonic acid, maleic acid, fumaric acid, itaconic acid, and aconitic acid; (meth)allyl compounds such as (meth)allyl alcohol, (meth)allyl sulfonic acid, and (meth)allyl amine; N-vinylcarboxylic acid amides such as N-vinylformamide, N-vinylacetamide, and N-vinylpropionic acid amide; and vinyl group-containing heterocyclic rings such as 2-vinylpyridine, 4-vinylpyridine, N-vinylimidazole, and N-vinylcarbazole. Further examples include salts of the ionizable monomers.

The weight average molecular weight of the growth control agent is preferably 10,000 to 3,000,000 and more preferably 100,000 to 2,000,000. When the weight average molecular weight of the growth control agent is less than 10,000, the generated amount of silver fine particles increases, which leads to a decrease in the yield of the silver nanowires. When more than 3,000,000, the silver nanowires are likely to become thick.

[Halide Salt]

The halide salt used in the present invention is not particularly limited, as long as it is a compound in which an inorganic or organic salt is dissolved in a polar solvent to dissociate a halide ion. At least one halide salt can be appropriately selected depending on its intended use. Specific examples of the halide salt includes alkali metal chlorides such as lithium chloride, sodium chloride, and potassium chloride; alkali metal bromides such as lithium bromide, sodium bromide, and potassium bromide; alkali metal iodides such as lithium iodide, sodium iodide, and potassium iodide; alkali earth metal chlorides such as magnesium chloride and calcium chloride; alkali earth metal bromides such as magnesium bromide and calcium bromide; earth metal halides such as aluminum chloride and aluminum bromide; zinc family metal halides such as zinc chloride and zinc bromide; carbon family metal halides such as tin chloride; transition metal halides such as manganese chloride, iron chloride, iron bromide, cobalt chloride, nickel chloride, nickel bromide, and zirconium oxychloride; amine hydrochlorides such as hydrazine hydrochloride, trimethylamine hydrochloride, triethylamine hydrochloride, ethanolamine hydrochloride, diethanolamine hydrochloride, triethanolamine hydrochloride, dimethylethanolamine hydrochloride, methyldiethanolamine hydrochloride, cyclohexylamine hydrochloride, ethylenediamine hydrochloride, diethylenetetramine hydrochloride, triethylenepentamine hydrochloride, and aniline hydrochloride; amino acid hydrochlorides such as alanine hydrochloride, arginine hydrochloride, lysine hydrochloride, and cysteine hydrochloride; ammonium salt halides such as ammonium chloride, ammonium bromide, tetrabutylammonium chloride, tetrabutylammonium bromide, and benzyltriethylammonium chloride; and phosphonium salt halides such as tetrabutylphosphonium chloride and tetraphenylphosphonium bromide.

These may be used individually or in combination of two or more. A chloride salt or a bromide salt is particularly preferably used. When a chloride salt is used alone, the yield is high, but the wire becomes thick. When a bromide salt is used alone, the yield decreases. Therefore, it is preferable to use a chloride salt and a bromide salt in combination. Among these, lithium chloride, sodium chloride, zirconium oxychloride, ammonium chloride, sodium bromide, and potassium bromide are preferably used. Also, [total number of moles of chlorine atoms in chloride]/[total number of moles of bromine atoms in bromide] (denoted as "C/Br") is preferably 0.10 to 15, more preferably 0.80 to 8.0, and further preferably 1.5 to 5.0. The yield decreases when less than 0.10, and the wire becomes thick when more than 15.

[Silver Salt]

The silver salt used in the present invention is not particularly limited, as long as it is a silver compound to be reduced by a polyol, excluding a silver complex. At least one silver salt can be appropriately selected depending on its intended use. Specific examples of the silver salt usable in the present invention include inorganic acid salts such as silver nitrate, silver chloride, silver sulfate, silver sulfamate, silver chlorate, and silver perchlorate; and organic acid salts such as silver acetate and silver lactate. Among these, silver nitrate is preferably used. It is noted that a silver complex refers to a silver compound having a ligand other than a counter anion. Examples of the ligand include ammonia, thiourea, and phosphines such as triphenylphosphine. As described herein, the growth control agent, the polyol, and other reaction solvents are not encompassed by the ligand.

[α-Hydroxycarbonyl Compound]

The manufacturing method according to the present invention is characterized in that an α-hydroxycarbonyl compound having a specific structure coexists when depositing silver nanowires in a polyol. When this α-hydroxycarbonyl compound coexists, thin silver nanowires can be manufactured with a high yield. It is known that the reaction can be performed at a lower temperature when this α-hydroxycarbonyl compound coexists than when it is not used. Accordingly, it is considered that the α-hydroxycarbonyl compound has a function as a reducing agent of a silver salt, together with a polyol.

The α-hydroxycarbonyl compound used in the present invention is an α-hydroxycarbonyl compound represented by general formula (2) below.

<general formula (2)>

[Chemical Formula 2]

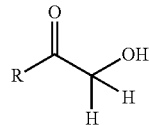

(in general formula (2), R indicates any of a hydrogen atom and a hydrocarbon group having 1 to 6 carbon atoms).

Specific examples thereof include hydroxyacetone, α-hydroxyacetophenone, 1-hydroxy-2-butanone, 1-hydroxy-2-pentanone, and 1-hydroxy-3-methyl-2-butanone. Among these, hydroxyacetone and α-hydroxyacetophenone are preferably used, and hydroxyacetone is more preferably used.

With an α-hydroxycarbonyl compound (for example, acetoin) other than the above-described α-hydroxycarbonyl compound represented by general formula (2), a desired reducing power cannot be obtained. The reason for this is not clear. However, for example, a formyl group which is presumed to have high reducing properties can be generated in equilibrium in the reaction system when a hydroxylcarbonyl backbone exists at a terminal, but such contribution does not exist when it exists inside. Therefore, it can be presumed that when a hydroxylcarbonyl backbone exists inside instead of at a terminal, desired reducing properties cannot be obtained.

[Other Reaction Solvent]

As the solvent used in the present invention, a reaction solvent other than the polyol may be added to such a degree that the solubility of the growth control agent and the growth of the silver nanowires are not inhibited. Examples thereof include, but not limited to, water; alcohols such as methanol and propanol; ketones such as methyl ethyl ketone and methyl isobutyl ketone; ethers such as ethylene glycol monomethyl ether, ethylene glycol dimethyl ether, diethylene glycol monomethyl ether, diethylene glycol dimethyl ether, ethylene glycol monomethyl ether acetate, propylene glycol monomethyl ether, tetrahydrofuran, and dioxane; and amides such as formamide, acetamide, N,N-dimethylformamide, N,N-dimethylacetamide, and N-methyl-2-pyrrolidinone.

[Reaction Temperature]

In the method for manufacturing silver nanowires according to the present invention, the reaction temperature is not particularly limited, as long as it allows silver nanowires to be formed. The reaction temperature is preferably 50 to 200° C., more preferably 100 to 170° C., and further preferably 100 to 150° C. When lower than 50° C., time is excessively taken for the formation of silver nanowires. When higher than 200° C., uniform wires are less likely to be obtained.

[Reaction Time]

In the method for manufacturing silver nanowires according to the present invention, the reaction time may be optionally set, as long as it allows silver nanowires to be formed. From the viewpoint of a manufacturing cost, within 72 hours is preferable.

[Method for Charging Raw Materials]

In a method for charging raw materials used in the present invention, raw materials may be previously dissolved in a used solvent such as a polyol and other reaction solvents and thereafter charged in a reaction vessel, or a used solvent may be charged in a reaction vessel and thereafter raw materials may be charged. For facilitating uniform mixing, it is preferable that raw materials be charged after previously dissolved in a used solvent. Although the charging order of raw materials is not particularly specified, it is preferable to mix a first solution containing the α-hydroxycarbonyl compound and a second solution containing the silver salt at a reaction temperature. At this time, the growth control agent, the halide salt, and other additives may be previously poured in the first solution or the second solution or simultaneously mixed as another solution. Since the major axis length of nanowires increases as the mixing time becomes longer, the mixing time of the first solution and the second solution is preferably 5 minutes or more and more preferably 10 minutes or more. Also, from the viewpoint of a manufacturing cost, within 720 minutes is preferable.

[Reaction Concentration of Silver Salt]

In terms of the formation of good silver nanowires, the concentration of the silver salt used in the present invention, with respect to the reaction liquid, is preferably 0.10 to 20% by mass and more preferably 0.20 to 10% by mass. When the concentration of the silver salt is less than 0.10% by mass, the generation amount of silver nanowires decreases resulting in a high manufacturing cost. When more than 20% by mass, silver nanowires of a good embodiment are less likely to be obtained.

[Reaction Concentration of Growth Control Agent]

In terms of the formation of good silver nanowires, the concentration of the growth control agent used in the present invention, with respect to the reaction liquid, is preferably 0.20 to 10% by mass and more preferably 0.40 to 8.0% by mass. When the concentration of the growth control agent is less than 0.20% by mass, the variation of the wire diameter becomes large, with the result that silver nanowires of a good embodiment are less likely to be obtained, and the yield decreases. When more than 10% by mass, an operation for removing the growth control agent when isolating silver nanowires becomes complicated, leading to an increase in manufacturing cost.

[Molar Ratio of Halide Salt to Silver Atoms in Silver Salt]

In terms of the formation of good silver nanowires, the halide salt used in the present invention is such that a molar ratio of the number of moles of all halogen atoms in the halide salt to silver atoms in the silver salt is preferably 0.0010 to 0.50 and more preferably 0.010 to 0.30. When the molar ratio of halogen atoms in the halide salt to silver atoms in the silver salt is less than 0.0010, the yield decreases, and silver nanowires of a good embodiment are less likely to be obtained. Also, when more than 0.50, the relative amount to the silver salt increases, leading to a decrease in the yield of the silver nanowires.

[Molar Ratio of α-Hydroxycarbonyl Compound to Silver Atoms in Silver Salt]

In terms of the formation of good silver nanowires, the α-hydroxycarbonyl compound used in the present invention is such that the molar ratio to silver atoms in the silver salt is preferably 0.010 to 5.0 and more preferably 0.020 to 3.0. When the molar ratio of the α-hydroxycarbonyl compound to silver atoms in the silver salt is less than 0.010, the addition effect is hardly obtained, and the yield does not improve. When the molar ratio of the α-hydroxycarbonyl compound to silver atoms in the silver salt is more than 5.0, the generation amount of silver fine particles increases, leading to a decrease in the yield of the silver nanowires.

As described herein, "nanowires" refers to a structure having a cross-sectional diameter of less than 1 μm and an aspect ratio (major axis length/diameter) of 2 or more. Also, "fine particles" as described herein refers to a structure having a cross-sectional diameter of less than 1 μm and an aspect ratio (major axis length/diameter) of less than 2.

[Major Axis Length of Silver Nanowires]

A transparent conductive film containing silver nanowires expresses conductivity because the silver nanowires contact each other to form a three-dimensional conductive network structure which is widely distributed in space. Therefore, the major axis length of the nanowires is preferably long from the viewpoint of conductivity. On the other hand, since excessively long nanowires are likely to tangle each other, short nanowires are preferable from the viewpoint of dispersion stability. Therefore, in the present invention, the major axis length of the silver nanowires is preferably 1 to 100 μm and more preferably 5 to 50 μm.

[Diameter of Silver Nanowires]

When silver nanowires are used as a transparent conductive film, the diameter of the wires is advantageously and preferably small in order to enhance transparency. In the present invention, the diameter of the silver nanowires is preferably less than 100 nm, more preferably less than 60 nm, and further preferably less than 40 nm.

[Step for Manufacturing Silver Nanowire Dispersion Liquid]

The silver nanowires obtained by the manufacturing method according to the present invention are preferably used for the manufacture of a silver nanowire dispersion liquid after the reaction liquid has been purified by known methods such as a centrifugal sedimentation method, a filtration method, a decantation method, an elutriation method, and a method of performing a redispersion treatment after precipitation with a solvent.

The purified silver nanowires are dispersed in a solvent to obtain a silver nanowire dispersion liquid. The solvent is not particularly limited, as long as the silver nanowires can be dispersed therein. Specific examples thereof include water; alcohols such as methanol, ethanol, 1-propanol, 2-propanol, 1-butanol, 2-butanol, 2-methyl-1-propanol, 2-methyl-2-propanol, diacetone alcohol, benzyl alcohol, and terpineol; polyols such as ethylene glycol, propylene glycol, 1,3-propanediol, 1,3-butanediol, 1,4-butanediol, and glycerin; glycol ethers such as ethylene glycol monomethyl ether, ethylene glycol monoethyl ether, ethylene glycol monobutyl ether, diethylene glycol monoethyl ether, diethylene glycol monobutyl ether, propylene glycol monomethyl ether, and dipropylene glycol monomethyl ether; glymes such as ethylene glycol dimethyl ether, diethylene glycol dimethyl ether, ethylene glycol diethyl ether, diethylene glycol diethyl ether, triethylene glycol diethyl ether, and diethylene glycol dibutyl ether; glycol ether esters such as ethylene glycol monomethyl ether acetate, diethylene glycol monoethyl ether acetate, diethylene glycol monobutyl ether acetate, and propylene glycol monomethyl ether acetate; esters such as ethyl acetate, butyl acetate, ethyl propionate, and ethyl lactate; ketones such as acetone, methyl ethyl ketone, cyclohexanone, and 3-methyl-2-hexanone; aromatics such as toluene and xylene; and a solvent including two or more thereof.

Also, when manufacturing a silver nanowire dispersion liquid, resin may be added for a purpose of improving dispersion stability. Specific examples of the resin include polysaccharides such as methyl cellulose, ethyl cellulose, hydroxyethyl cellulose, hydroxypropyl cellulose, hydroxypropyl methyl cellulose, carboxymethyl cellulose, nitrocellulose, cellulose acetate, guar gum, xanthan gum, tamarind seed gum, *psyllium* seed gum, ghatti gum, locust bean gum, hydroxyethyl guar gum, and hydroxypropyl guar gum, and derivatives thereof; and poly(meth)acryl resin, polyurethane resin, polyester resin, alkyd resin, epoxy resin, ethylene vinyl acetate resin, polyvinyl alcohol, and derivatives thereof.

The silver nanowire dispersion liquid according to the present invention can be used for, for example, forming a transparent conductive film. A transparent conductive film is obtained by coating a substrate with the silver nanowire dispersion liquid by a known method. Specific examples of the coating method include a spin coating method, a slit coating method, a dip coating method, a blade coating method, a bar coating method, a spraying method, a relief printing method, an intaglio printing method, a screen printing method, a lithographic printing method, a dispense method, and an inkjet method. Also, coating may be performed multiple times by these coating methods.

The substrate having the transparent conductive film can be widely applied to various devices such as an electrode material for liquid crystal displays, an electrode material for plasma displays, an electrode material for organic electroluminescence displays, an electrode material for electronic papers, an electrode material for touch panels, an electrode material for thin film-type amorphous Si solar cells, an electrode material for dye-sensitized solar cells, an electromagnetic wave shielding material, and an antistatic material.

EXAMPLES

Hereinafter, the present invention will be specifically described based on examples of the present invention. However, the present invention is not limited to these examples.

The yield of the silver nanowires, the diameter of the silver nanowires, the major axis length of the silver nanowires were measured and evaluated in the following manner.

[Yield of Silver Nanowires]

The yield of the silver nanowires was calculated from a ratio in mass of silver in the purified silver nanowire solution to silver atoms in the silver salt charged for the reaction. Also, the mass of silver in the purified silver nanowire solution used herein was calculated from a weight after it has been dried in an electric dryer at 525° C. for 2 hours or more. The evaluation criteria were the following five levels. When the evaluation level is D or higher, no practical problem is caused. The evaluation level is preferably B or higher.

Evaluation Criteria
A: 35% or more
B: 25% to 35%
C: 15% to 25%
D: 5% to 15%
E: less than 5%

[Diameter of Silver Nanowires]

Using a scanning electron microscope (SEM; manufactured by JEOL Ltd., JSM-5610LV), 100 silver nanowires were observed. An average value thereof was defined as the diameter of the silver nanowires. The evaluation criteria were the following four levels. When the evaluation level is D or higher, no practical problem is caused. The evaluation level is preferably B or higher.

Evaluation Criteria
A: 20 nm to 35 nm
B: 35 nm to 40 nm
C: 40 nm to 45 nm
D: 45 nm to 60 nm

[Major Axis Length of Silver Nanowires]

Using a scanning electron microscope (SEM; manufactured by JEOL Ltd., JSM-5610LV), 100 silver nanowires were observed. An average value thereof was defined as the major axis length of the silver nanowires. The evaluation criteria were the following five levels. When the evaluation level is E or higher, no practical problem is caused. The evaluation level is preferably D or higher and more preferably C or higher.

Evaluation Criteria
A: 11 μm to 30 μm
B: 9 μm to 11 μm
C: 7 μm to 9 μm
D: 5 μm to 7 μm
E: 1 μm to 5 μm

[Evaluation of Reaction Efficiency]

The reaction efficiency of the silver nanowires was evaluated by the yield of the silver nanowires per unit reaction time. That is, calculation was performed by substituting the reaction time and the yield of the silver nanowires for the following formula (1). The evaluation criteria were the following five levels. When the evaluation level is D or higher, no practical problem is caused. The evaluation level is preferably B or higher.

$$[\text{reaction efficiency}] = [\text{yield (\%) of silver nanowires}] / [\text{reaction time(hours)}] \quad (1)$$

Evaluation Criteria
A: 35 or more
B: 25 to 35
C: 15 to 25
D: 5 to 15
E: less than 5

<Synthesis of Growth Control Agent>

Synthesis Example 1

Into a four-necked flask equipped with a stirrer, a thermometer, a reflux condenser, and a nitrogen gas introduction pipe, 112.5 parts by mass of N-(2-hydroxyethyl)acrylamide, 37.5 parts by mass of N,N-diethylacrylamide, 50 parts by mass of propylene glycol, and 750 parts by mass of ion exchanged water were charged. Thereafter, the mixture was increased in temperature to 70° C. while delivering nitrogen gas. Subsequently, 50 parts by mass of a 3% by mass propylene glycol solution of 2,2'-azobis(2-methylbutyronitrile) was added and subjected to a reaction at 90° C. for 3 hours to prepare an N-hydroxyethylacrylamide/N,N-dimethylacrylamide copolymer. Then, 600 parts of propylene glycol was poured into 400 parts of the reaction liquid. Thereafter, solvent substitution was performed by distilling away a distillation liquid in an amount that is a little larger than the stoichiometric amount of contained water through vacuum distillation. Into the solvent-substituted liquid, propylene glycol was added in an amount that is necessary for adjusting the concentration to 6% by mass. Accordingly, a 6% by mass propylene glycol solution of a growth control agent, which is used for preparing silver nanowires, was obtained. The weight average molecular weight calculated by a GPC-MALS method using an Agilent 1100 HPLC system (manufactured by Agilent Technologies, Inc.) was 420000.

<Preparation of silver ammonia complex solution>

To a silver nitrate aqueous solution, 1 N ammonia water was added until the solution turned transparent. Thereafter, the concentration was adjusted with ion exchanged water to obtain a 10% by mass silver ammonia complex aqueous solution. The obtained aqueous solution was further diluted with propylene glycol to obtain a 5% by mass silver ammonia complex solution.

<Production of Silver Nanowires>

Example 1

While delivering nitrogen into a four-necked flask equipped with a stirrer, a thermometer, and a nitrogen introduction pipe, 6.87 parts by mass of polyvinyl pyrrolidone (a product of Kanto Chemical Co., Ltd., polyvinyl pyrrolidinone (K=90) molecular weight 360,000) as the growth control agent, 4.58 parts by mass of hydroxyacetone as the α-hydroxycarbonyl compound (a), 841.3 parts by mass of propylene glycol as the polyol, and 5.35 parts by mass of a 1.5% by mass propylene glycol solution of sodium chloride as the halide salt, and 1.88 parts by mass of a 2.5% by mass propylene glycol solution of sodium bromide were added and stirred at room temperature for 30 minutes. Subsequently, the internal temperature was increased to 145° C., and 140.0 parts by mass of a 5% by mass propylene glycol solution of silver nitrate as the silver salt was added over 15 minutes. The mixture was further stirred for 30 minutes to synthesize silver nanowires. Thereafter, the reaction liquid was collected. To 100 parts by mass of the collected reaction liquid, 100 parts by mass of water was added for dilution. The diluted reaction liquid was vacuum-filtered through a membrane filter. Furthermore, water was added on the residue, and vacuum filtration was repeated five times to isolate silver nanowires. The obtained silver nanowires were dispersed in an aqueous solvent, and thereafter, physical properties thereof were measured. The result is illustrated in Table 5.

Examples 2 to 23 and Comparative Examples 1 to 7

In Examples 2 to 23 and Comparative Examples 1 to 7, silver nanowires were obtained in the same manner as in Example 1, except that the conditions were changed as described in Table 1 to Table 4. The results are illustrated in Table 5.

TABLE 1

| | Silver salt | | Growth | | | Halide salt | | | |
|---|---|---|---|---|---|---|---|---|---|
| | | 5 mass % solution | control agent | | | | 1.5 mass % solution | | 2.5 mass % solution |
| | Type | (parts by mass) | Type | Parts by mass | Polyol Type | Chloride salt | (parts by mass) | Bromide salt | (parts by mass) |
| Example 1 | Silver nitrate | 140 | PVP K90 | 6.87 | Propylene glycol | Sodium chloride | 5.35 | Sodium bromide | 1.88 |
| Example 2 | Silver nitrate | 140 | PVP K90 | 6.87 | Propylene glycol | Sodium chloride | 5.35 | Sodium bromide | 1.88 |
| Example 3 | Silver nitrate | 140 | PVP K90 | 6.87 | Propylene glycol | Sodium chloride | 5.35 | Sodium bromide | 1.88 |
| Example 4 | Silver nitrate | 140 | PVP K90 | 6.87 | Propylene glycol | Sodium chloride | 5.35 | Sodium bromide | 1.88 |
| Example 5 | Silver nitrate | 140 | PVP K90 | 6.87 | Propylene glycol | Sodium chloride | 5.35 | Sodium bromide | 1.88 |
| Example 6 | Silver nitrate | 140 | PVP K90 | 6.87 | Propylene glycol | Sodium chloride | 5.35 | Sodium bromide | 1.88 |
| Example 7 | Silver nitrate | 140 | PVP K90 | 6.87 | Propylene glycol | Sodium chloride | 5.35 | Sodium bromide | 1.88 |
| Example 8 | Silver nitrate | 140 | PVP K90 | 6.87 | Propylene glycol | Sodium chloride | 5.35 | Sodium bromide | 1.88 |
| Example 9 | Silver nitrate | 140 | PVP K90 | 6.87 | Propylene glycol | Sodium chloride | 5.35 | Sodium bromide | 1.88 |
| Example 10 | Silver nitrate | 140 | PVP K90 | 6.87 | Propylene glycol | Sodium chloride | 5.35 | Sodium bromide | 1.88 |
| Example 11 | Silver nitrate | 140 | PVP K90 | 20.61 | Propylene glycol | Sodium chloride | 5.35 | Sodium bromide | 1.88 |
| Example 12 | Silver nitrate | 140 | PVP K90 | 3.43 | Propylene glycol | Sodium chloride | 5.35 | Sodium bromide | 1.88 |
| Example 13 | Silver nitrate | 140 | PVP K90 | 6.87 | Propylene glycol | Sodium chloride | 26.76 | Sodium bromide | 9.42 |
| Example 14 | Silver nitrate | 140 | PVP K90 | 6.87 | Propylene glycol | Sodium chloride | 40.14 | Sodium bromide | 14.13 |
| Example 15 | Silver nitrate | 140 | PVP K90 | 6.87 | Propylene glycol | Sodium chloride | 1.07 | Sodium bromide | 0.377 |

TABLE 2

| | α-Hydroxycarbonyl compound | | Reaction temperature (° C.) | Solution of silver salt mixing time (min) | Reaction time (hr) | Concentration of silver salt (mass %) | Concentration of growth control agent (mass %) | Molar ratio of halide salt to silver atoms in silver salt | Cl/Br | Molar ratio of α-hydroxycarbonyl compound to silver atoms in silver salt |
|---|---|---|---|---|---|---|---|---|---|---|
| | Type | Parts by mass | | | | | | | | |
| Example 1 | Hydroxyacetone | 4.58 | 145 | 15 | 0.75 | 0.7 | 0.69 | 0.044 | 3 | 1.5 |
| Example 2 | α-hydroxyacetophenone | 8.40 | 145 | 15 | 0.75 | 0.7 | 0.69 | 0.044 | 3 | 1.5 |
| Example 3 | Hydroxyacetone | 2.75 | 145 | 30 | 1 | 0.7 | 0.69 | 0.044 | 3 | 0.9 |
| Example 4 | Hydroxyacetone | 1.83 | 145 | 30 | 1 | 0.7 | 0.69 | 0.044 | 3 | 0.6 |
| Example 5 | Hydroxyacetone | 0.702 | 145 | 30 | 1 | 0.7 | 0.69 | 0.044 | 3 | 0.23 |
| Example 6 | Hydroxyacetone | 10.68 | 145 | 30 | 1 | 0.7 | 0.69 | 0.044 | 3 | 3.5 |
| Example 7 | Hydroxyacetone | 0.46 | 145 | 30 | 1 | 0.7 | 0.69 | 0.044 | 3 | 0.15 |
| Example 8 | Hydroxyacetone | 2.75 | 145 | 90 | 2 | 0.7 | 0.69 | 0.044 | 3 | 0.9 |
| Example 9 | Hydroxyacetone | 2.75 | 145 | 150 | 3 | 0.7 | 0.69 | 0.044 | 3 | 0.9 |
| Example 10 | Hydroxyacetone | 2.75 | 145 | 5 | 0.38 | 0.7 | 0.69 | 0.044 | 3 | 0.9 |
| Example 11 | Hydroxyacetone | 2.75 | 145 | 30 | 1 | 0.7 | 2.06 | 0.044 | 3 | 0.9 |
| Example 12 | Hydroxyacetone | 2.75 | 145 | 30 | 1 | 0.7 | 0.34 | 0.044 | 3 | 0.9 |
| Example 13 | Hydroxyacetone | 2.75 | 145 | 30 | 1 | 0.7 | 0.69 | 0.22 | 3 | 0.9 |
| Example 14 | Hydroxyacetone | 2.75 | 145 | 30 | 1 | 0.7 | 0.69 | 0.33 | 3 | 0.9 |
| Example 15 | Hydroxyacetone | 2.75 | 145 | 30 | 1 | 0.7 | 0.69 | 0.0089 | 3 | 0.9 |

TABLE 3

| | Silver salt | | Growth control agent | | Halide salt | | | | |
|---|---|---|---|---|---|---|---|---|---|
| | | 5 mass % solution | | | | 1.5 mass % solution | | 2.5 mass % solution | |
| | Type | (parts by mass) | Type | Parts by mass | Polyol Type | Chloride salt | (parts by mass) | Bromide salt | (parts by mass) |
| Example 16 | Silver nitrate | 140 | PVP K90 | 6.87 | Propylene glycol | Sodium chloride | 4.76 | Sodium bromide | 2.51 |
| Example 17 | Silver nitrate | 140 | PVP K90 | 6.87 | Propylene glycol | Sodium chloride | 3.89 | Sodium bromide | 3.43 |
| Example 18 | Silver nitrate | 140 | PVP K90 | 6.87 | Propylene glycol | Sodium chloride | 5.71 | Sodium bromide | 1.51 |
| Example 19 | Silver nitrate | 140 | PVP K90 | 6.87 | Propylene glycol | Sodium chloride | 6.12 | Sodium bromide | 1.08 |
| Example 20 | Silver nitrate | 140 | PVP K90 | 6.87 | Propylene glycol | Sodium chloride | 5.35 | Sodium bromide | 1.88 |
| Example 21 | Silver nitrate | 140 | PVP K90 | 6.87 | Propylene glycol | Lithium chloride | 3.88 | Potassium bromide | 2.18 |
| Example 22 | Silver nitrate | 140 | PVP K90 | 6.87 | Ethylene glycol | Lithium chloride | 3.88 | Potassium bromide | 2.18 |
| Example 23 | Silver nitrate | 140 | Growth control agent (Synthesis Example 1) | 36 | Propylene glycol | Sodium chloride | 4.76 | Sodium bromide | 2.51 |
| Comparative Example 1 | Silver nitrate | 140 | PVP K90 | 6.87 | Propylene glycol | Sodium chloride | 5.35 | Sodium bromide | 1.88 |
| Comparative Example 2 | Silver nitrate | 140 | PVP K90 | 6.87 | Propylene glycol | Sodium chloride | 5.35 | Sodium bromide | 1.88 |
| Comparative Example 3 | Silver nitrate | 140 | PVP K90 | 6.87 | Propylene glycol | Sodium chloride | 5.35 | Sodium bromide | 1.88 |
| Comparative Example 4 | Silver nitrate | 140 | PVP K90 | 6.87 | Propylene glycol | Sodium chloride | 5.35 | Sodium bromide | 1.88 |
| Comparative Example 5 | Silver nitrate | 140 | PVP K90 | 6.87 | Propylene glycol | Sodium chloride | 5.35 | Sodium bromide | 1.88 |
| Comparative Example 6 | Silver ammonia complex | 140 | PVP K90 | 6.87 | Propylene glycol | Sodium chloride | 5.35 | Sodium bromide | 1.88 |
| Comparative Example 7 | Silver nitrate | 140 | PVP K90 | 6.87 | Propylene glycol | Sodium chloride | 5.35 | Sodium bromide | 1.88 |

TABLE 4

| | α-hydroxycarbonyl compound | | Reaction temperature (° C.) | Solution of silver salt mixing time (min) | Reaction time (hr) | Concentration of silver salt (mass %) | Concentration of growth control agent (mass %) | Molar ratio of halide salt to silver atoms in silver salt | | Molar ratio of α-hydroxycarbonyl compound to silver atoms in silver salt |
|---|---|---|---|---|---|---|---|---|---|---|
| | Type | Parts by mass | | | | | | | Cl/Br | |
| Example 16 | Hydroxyacetone | 2.75 | 145 | 30 | 1 | 0.7 | 0.69 | 0.044 | 2 | 0.9 |
| Example 17 | Hydroxyacetone | 2.75 | 145 | 30 | 1 | 0.7 | 0.69 | 0.044 | 1.2 | 0.9 |
| Example 18 | Hydroxyacetone | 2.75 | 145 | 30 | 1 | 0.7 | 0.69 | 0.044 | 4 | 0.9 |
| Example 19 | Hydroxyacetone | 2.75 | 145 | 30 | 1 | 0.7 | 0.69 | 0.044 | 6 | 0.9 |
| Example 20 | Hydroxyacetone | 2.75 | 160 | 30 | 1 | 0.7 | 0.69 | 0.044 | 3 | 0.9 |
| Example 21 | Hydroxyacetone | 2.75 | 145 | 30 | 1 | 0.7 | 0.69 | 0.044 | 3 | 0.9 |
| Example 22 | Hydroxyacetone | 2.75 | 145 | 30 | 1 | 0.7 | 0.69 | 0.044 | 3 | 0.9 |
| Example 23 | Hydroxyacetone | 2.75 | 130 | 30 | 1 | 0.7 | 3.60 | 0.044 | 2 | 0.9 |
| Comparative Example 1 | None | 0 | 145 | 15 | 0.75 | 0.7 | 0.69 | 0.044 | 3 | 0 |
| Comparative Example 2 | Acetoin | 5.43 | 145 | 15 | 0.75 | 0.7 | 0.69 | 0.044 | 3 | 1.5 |
| Comparative Example 3 | Glucose | 11.13 | 145 | 15 | 0.75 | 0.7 | 0.69 | 0.044 | 3 | 1.5 |
| Comparative Example 4 | Fructose | 11.13 | 145 | 15 | 0.75 | 0.7 | 0.69 | 0.044 | 3 | 1.5 |
| Comparative Example 5 | Dihydroxyacetone | 5.57 | 145 | 15 | 0.75 | 0.7 | 0.69 | 0.044 | 3 | 1.5 |
| Comparative Example 6 | Hydroxyacetone | 2.75 | 145 | 30 | 1 | 0.7 | 0.69 | 0.044 | 3 | 0.9 |
| Comparative Example 7 | None | 0 | 145 | 15 | 8 | 0.7 | 0.69 | 0.044 | 3 | 0 |

TABLE 5

| | Reaction time (hr) | Silver nanowires | | | |
|---|---|---|---|---|---|
| | | Wire yield | Reaction efficiency | Major axis length | Diameter |
| Example 1 | 0.75 | B | A | C | A |
| Example 2 | 0.75 | B | A | A | D |
| Example 3 | 1 | A | A | B | A |
| Example 4 | 1 | A | A | B | A |
| Example 5 | 1 | A | A | A | A |
| Example 6 | 1 | D | D | D | A |
| Example 7 | 1 | D | D | A | A |
| Example 8 | 2 | A | C | A | A |
| Example 9 | 3 | A | D | A | B |
| Example 10 | 0.58 | A | A | E | C |
| Example 11 | 1 | A | A | B | A |
| Example 12 | 1 | C | C | B | B |
| Example 13 | 1 | B | B | C | A |
| Example 14 | 1 | C | C | D | A |
| Example 15 | 1 | C | C | A | D |
| Example 16 | 1 | B | B | C | A |
| Example 17 | 1 | D | D | D | A |
| Example 18 | 1 | A | A | B | B |
| Example 19 | 1 | A | A | C | D |
| Example 20 | 1 | A | A | B | B |
| Example 21 | 1 | B | B | C | A |
| Example 22 | 1 | C | C | A | C |
| Example 23 | 1 | C | C | A | C |
| Comparative Example 1 | 0.75 | E | E | — | — |
| Comparative Example 2 | 0.75 | E | E | — | — |
| Comparative Example 3 | 0.75 | E | E | — | — |
| Comparative Example 4 | 0.75 | E | E | — | — |
| Comparative Example 5 | 0.75 | E | E | — | — |
| Comparative Example 6 | 1 | E | E | — | — |
| Comparative Example 7 | 8 | E | E | — | — |

The mark "-" in Table 5 indicates that physical properties of the silver nanowires were not evaluated because the yield of the silver nanowires was low.

Example 24

Under the reaction conditions of Example 3, silver nanowires were manufactured five times by changing the manufacturing lot of propylene glycol to be used. The result is illustrated in Table 6.

Example 25

Under the reaction conditions of Example 24, silver nanowires were manufactured in the same manner except that the reaction temperature was 160° C. The result is illustrated in Table 6.

Comparative Example 8

Under the reaction conditions of Example 24, silver nanowires were manufactured in the same manner except that hydroxyacetone was not added, and the reaction temperature was 160° C. The result is illustrated in Table 6.

The coefficient of variance in Table 6 indicates the variation of the results of the manufacture performed five times and is calculated according to the following formula (2). The smaller value indicates the smaller variation.

[coefficient of variance]=[standard deviation of evaluation item]/[average value of evaluation item]　　(2)

TABLE 6

|  |  | Wire yield | Silver nanowires Major axis length | Diameter |
|---|---|---|---|---|
| Example 24 | Evaluation results | A | B | A |
|  |  | A | A | A |
|  |  | A | B | A |
|  |  | A | B | A |
|  |  | A | A | A |
|  | Coefficient of variance | 0.16 | 0.05 | 0.05 |
| Example 25 | Evaluation results | A | B | B |
|  |  | A | B | B |
|  |  | A | B | A |
|  |  | A | C | B |
|  |  | A | B | B |
|  | Coefficient of variance | 0.21 | 0.08 | 0.09 |
| Comparative Example 8 | Evaluation results | C | A | B |
|  |  | D | A | B |
|  |  | A | A | D |
|  |  | C | B | B |
|  |  | E | A | C |
|  | Coefficient of variance | 0.75 | 0.23 | 0.26 |

It is understood that in all of Examples 1 to 23 in which the α-hydroxycarbonyl compound defined in the present invention is used in combination, the yield and the reaction efficiency are both at a practical level, and the shape of the obtained silver nanowires is also at a desired level.

On the other hand, in Comparative Example 1 in which the α-hydroxycarbonyl compound defined in the present invention is not used in combination, the reduction reaction of silver ions hardly proceeds under the same conditions as those in Example 1. Therefore, both the yield and the reaction efficiency are better in Example 1. It is also understood that in Comparative Example 7 in which the reaction time is longer than in Comparative Example 1, the yield is not that better.

In order that a reaction proceeds in Comparative Example 1 and Comparative Example 7, the reaction temperature needs to be high. However, when the reaction temperature is high, the variations of the yield and the obtained wire shape become large due to a difference in the manufacturing lot of propylene glycol as in Comparative Example 8. On the other hand, it is understood that in the manufacturing method according to the present invention in which the α-hydroxycarbonyl compound is used as in Examples 24 and 25, the variations of both the yield of the silver nanowires and the wire shape are small.

In Comparative Examples 2 to 5 in which an α-hydroxycarbonyl compound other than the α-hydroxycarbonyl compound defined in the present invention was used, a reduction reaction hardly proceeded similarly to in Comparative Example 1. That is, it is understood that silver nanowires having a desired shape can be efficiently obtained only when the α-hydroxycarbonyl compound defined in the present invention was used.

In Comparative Example 6 in which the silver ammonia complex was used instead of the silver nitrate in Example 3, silver nanowires were not obtained. This demonstrates that the silver salt to be used should not have a ligand, like silver nitrate, and a silver complex is excluded.

It is understood that in Examples 3 to 5 in which the molar ratio of the α-hydroxycarbonyl compound to silver atoms in the silver salt is within a more preferable range than in Examples 6 and 7, both the yield and the reaction efficiency improve.

It is understood that in Examples 3, 8, and 9 in which the mixing time of the first solution containing the α-hydroxycarbonyl compound and the second solution containing the silver salt is within a more preferable range than in Example 10, silver nanowires having a more preferable wire major axis length are obtained.

In Examples 3 and 11 in which the concentration of the growth control agent to the reaction liquid is within a more preferable range than in Example 12, both the yield and the reaction efficiency improve, and silver nanowires having a more preferable wire diameter are obtained.

It is understood that in Examples 3 and 13 in which the molar ratio of halogen atoms in the halide salt to silver atoms in the silver salt is within a more preferable range than in Examples 14 and 15, both the yield and the reaction efficiency improve.

The invention claimed is:

1. A method for manufacturing silver nanowires, comprising reacting a reaction liquid including a growth control agent, a halide salt, a polyol, a silver salt, and an α-hydroxycarbonyl compound (a) represented by formula (1) below, to obtain the silver nanowires:

(a) <general formula (1)>

[Chemical Formula 1]

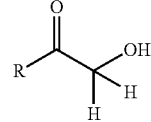

(in general formula (1), R indicates any of a hydrogen atom and a hydrocarbon group having 1 to 6 carbon atoms),
wherein the reaction liquid includes the growth control agent, the halide salt, the polyol, the silver salt and either one of hydroxyacetone or α-hydroxyacetophenone, and
the silver salt excludes a silver complex.

2. The method for manufacturing silver nanowires according to claim 1, wherein the silver salt is silver nitrate.

3. The method for manufacturing silver nanowires according to claim 1, wherein a molar ratio of the α-hydroxycarbonyl compound (a) to silver atoms in the silver salt is 0.20 to 3.0.

4. The method for manufacturing silver nanowires according to claim 1, comprising a step of mixing a first solution containing the α-hydroxycarbonyl compound (a) and a second solution containing the silver salt at a reaction temperature over 10 minutes or more.

5. The method for manufacturing silver nanowires according to claim 1, wherein a concentration of the growth control agent to the reaction liquid is 0.40% by mass or more.

6. The method for manufacturing silver nanowires according to claim 1, wherein a molar ratio of halogen atoms in the halide salt to silver atoms in the silver salt is 0.010 to 0.30.

7. The method for manufacturing silver nanowires according to claim 1, wherein the reacting the reaction liquid comprises heating the reaction liquid at 50° C. to 200° C. for 72 hours or less.

8. The method for manufacturing silver nanowires according to claim 1, wherein the reacting the reaction liquid comprises heating the reaction liquid at 130° C. to 160° C. for 0.38 hours to 3 hours.

9. The method for manufacturing silver nanowires according to claim 1, wherein the halide salt includes a chloride salt and a bromide salt.

10. The method for manufacturing silver nanowires according to claim 9, wherein the chloride salt includes at least one of a sodium chloride or a lithium chloride, and the bromide salt includes at least one of a sodium bromide or a potassium bromide.

11. The method for manufacturing silver nanowires according to claim 1, wherein a major axis length of each of the silver nanowires is 5 to 50 μm, and a diameter of each of the silver nanowires is less than 40 nm.

12. The method for manufacturing silver nanowires according to claim 1, wherein the polyol is at least one selected from a group consisting of ethylene glycol, propylene glycol, 1,3-propanediol and glycerin.

13. The method for manufacturing silver nanowires according to claim 1, wherein the growth control agent is polyvinyl pyrrolidone or poly-N-substituted (meth)acrylamide.

14. The method for manufacturing silver nanowires according to claim 1, wherein a weight average molecular weight of the growth control agent is 100,000 to 2,000,000.

15. The method for manufacturing silver nanowires according to claim 1, wherein the halide salt includes a chloride salt and a bromide salt, and [total number of moles of chlorine atoms in chloride]/[total number of moles of bromine atoms in bromide] is 1.5 to 5.0.

16. The method for manufacturing silver nanowires according to claim 1, wherein a molar ratio of the α-hydroxycarbonyl compound (a) to silver atoms in the silver salt is 0.010 to 5.0.

17. The method for manufacturing silver nanowires according to claim 1, wherein a molar ratio of hydroxyacetone or α-hydroxyacetophenone to silver atoms in the silver salt is 0.15 to 3.5.

* * * * *